US006408315B1

United States Patent
McManus et al.

(10) Patent No.: US 6,408,315 B1
(45) Date of Patent: Jun. 18, 2002

(54) COMPUTER-BASED TRAINING SYSTEM USING DIGITALLY COMPRESSED AND STREAMED MULTIMEDIA PRESENTATIONS

(75) Inventors: Richard W. McManus, Issaquah; Garry L. Struthers, Bellevue; Kyle G. Swinney, Woodinville; Rodney R. Dye, Redmond; Michael T. Wills, Lynwood; William G. Bronske, Everett; Mark A. Waddle, Olympia, all of WA (US)

(73) Assignee: Iguana Training, Inc., Issaquah, WA (US)

( * ) Notice: Subject to any disclaimer, the term of this patent is extended or adjusted under 35 U.S.C. 154(b) by 0 days.

(21) Appl. No.: 09/995,148

(22) Filed: Nov. 27, 2001

Related U.S. Application Data

(62) Division of application No. 09/543,644, filed on Apr. 5, 2000.

(51) Int. Cl.[7] .............................................. H04N 17/00
(52) U.S. Cl. ..................... 707/500.1; 382/232; 704/500; 345/723; 348/14.13; 709/232
(58) Field of Search ........................... 348/14.12, 14.13, 348/14.14; 707/500.1, 104.1; 709/219, 232; 386/77; 345/716–726; 375/240; 382/166, 232–253; 704/500, 503

(56) References Cited

U.S. PATENT DOCUMENTS

| | | | | |
|---|---|---|---|---|
| 5,440,677 A | * | 8/1995 | Case et al. ................ | 707/500.1 |
| 5,485,611 A | * | 1/1996 | Astle .......................... | 348/564 |
| 5,532,833 A | * | 7/1996 | Hong et al. .................. | 386/77 |
| 5,596,364 A | * | 1/1997 | Wolf et al. .................. | 348/180 |
| 5,615,017 A | * | 3/1997 | Choi .......................... | 348/159 |
| 5,686,964 A | * | 11/1997 | Tabatabai et al. ....... | 375/240.01 |
| 5,790,717 A | * | 8/1998 | Judd .......................... | 382/323 |
| 5,845,088 A | * | 12/1998 | Lewis ....................... | 375/240.1 |
| 5,995,151 A | * | 11/1999 | Naveen et al. .......... | 375/240.24 |
| 6,172,672 B1 | * | 1/2001 | Ramasubramanian et al. ... | 345/720 |
| 6,181,711 B1 | * | 1/2001 | Zhang et al. ................ | 370/468 |
| 6,192,183 B1 | * | 2/2001 | Taniguchi et al. .......... | 345/723 |
| 6,249,280 B1 | * | 6/2001 | Garmon et al. ............. | 345/723 |
| 6,278,447 B1 | * | 8/2001 | Anderson ................... | 345/723 |
| 6,285,361 B1 | * | 9/2001 | Brewer et al. ............. | 345/723 |
| 6,327,420 B1 | * | 12/2001 | Furukawa ................... | 345/716 |

* cited by examiner

Primary Examiner—Joseph H. Feild
(74) Attorney, Agent, or Firm—Black Lowe & Graham PLLC

(57) ABSTRACT

The present invention provides a system by which customized quality computer-based training ("CBT") can be presented over a global network such as the Internet with low development costs, low hosting costs, inexpensive class production, and high-quality audio-visual content. A student, having an active connection to the server from a remote client, enters the CBT website and registers as a new student by providing necessary pertinent information to the server host. Upon completion of the registration process, the student begins his or her interaction with the online computer-based training plan. The online plan includes digital images and digital audio that is compressed and transmitted from a host server to the student's computer via the Internet. The images and audio are taken from digital nondigital sources and converted to a digital format. The images for a plan are selected and compressed into an appropriate compression format. The audio presented along with the video is also compressed in a similar manner. Once compressed, the images and audio are prepared for a slide show computer-based training plan format. The plan is tested for image and audio quality. Where necessary, an image or audio segment is recompressed. Better compression provides for a more fluid viewing of the plan without sacrificing image or audio quality. Additionally, server side buffer programming integrated into the plan allows optimum viewing of the streaming images and audio without concern for bandwidth limitations, thus allowing a student to complete the plans quickly and without interruptions.

10 Claims, 5 Drawing Sheets

COMPUTER-BASED TRAINING SYSTEM USING DIGITALLY COMPRESSED AND STREAMED MULTIMEDIA PRESENTATIONS

This divisional application claims priority from U.S. patent application Ser. No. 09/543,644 filed Apr. 5, 2000, pending.

FIELD OF THE INVENTION

This invention relates generally to computer-based training and, more specifically, to an online computer-based training system created with digitally compressed multimedia presentations made available to students from a server computer to a local or remote client computer over a global network.

BACKGROUND OF THE INVENTION

Many industries and professions require occupation-specific workers to maintain a certain educational standard within their industry. Typically, a person will be required to take a fixed number of hours of specific training in order to maintain their standing in a profession. A person in need of continuing or on-going training has many alternatives for taking classes that meet the requirements to maintain their professional standing. Training has been available, for example, through professional groups, community colleges, and other such accredited continuing education organizations. A person in need of such training typically attends a class or training session away from their job site. More recently, however, with the inception and acceptance of the Internet and development of more powerful computers, continuing education organizations have begun to offer such training over the Internet. Additionally, a proliferation of software development tools aimed at creating interactive Internet sites have helped provide the toolset to create such sites. These sites provide computer-based training ("CBT") lessons over the Internet. CBT refers to the interactivity between a person, a computer-based training plan, and the computer where the lesson resides. The computer-based training plan can contain various training media including audio, video, or other visually displayed multimedia images. Additionally, the plan can include a series of questions and an exam that tests the knowledge gained from the computer-based training plan. Generally, these sites can be categorized into two types: simple interactive Hypertext Markup Language ("HTML") based sites and custom proprietary sites, which may or may not include a hybrid of off-the-shelf CBT software and proprietarily programmed software.

In its simplest form, CBT based on HTML is presented in a standard Internet browser-compatible static web page format. Because of the need to make HTML-based web pages compatible with various competing web page browsers and the need to control site development cost, these sites limit computer-based training plan presentation to static text and figures. At some sites, interactivity with the presented computer-based training plan is possible without registering for the class. In this situation, a student pays for the class when they desire to take the exam. At that time, the student gains simple interactive access to the test, takes the test, submits the test for scoring, and subsequently receives a certificate upon successful completion of the test. This certificate is viewable on the computer screen and printable to a printer attached to the student's computer. In even a simpler form, the student is given the ability to print the test. The student takes the test in its printed-paper format and sends it to the web-based service, where it is scored and a certificate returned, if the student passes.

An advantage of the HTML approach is that the programming of the web-based content is simple and inexpensive. The programming may be in standard HTML and a server-side script such as the Active Server Page ("ASP") scripting environment for Microsoft Internet Information Server in which you can combine HTML, scripts, and reusable server components to create dynamic web pages. Alternatively, a programming environment such as Common Gateway Interface ("CGI") may be used that enables the use of web site forms. Both ASP and CGI are simple to use and readily available web page programming environments. In its simplest form, a web-based CBT service has no student databases to track. Additionally, the web pages remain logically independent of one another. Another advantage of the simple HTML approach to CBT is that hardware investment is limited, both in terms of acquisition and maintenance, as these sites can be hosted on service provider servers, thus avoiding costly dedicated servers.

A disadvantage to HTML-based CBT is that the computer-based training plan is limited to very simplistic static or near static material. It is not possible to use this approach to create complex interactive class content or to track student progress.

A custom CBT site is presented using off-the-shelf CBT software, proprietary CBT software, or a hybrid of the two. A more complex CBT site generally uses custom software written to track student interaction with the computer-based training plan and offers more varied web content. These sites allow a student to interactively register for a class and receive a student number and password. Students take class segments over time. A student logs onto the system using their student name and password each time a student returns to the class segments. The sites are designed to incorporate server-side relational-type databases that track a student's progress. Classes may require multiple quizzes, a final exam, or both. Classes are interactive, and a student's progress within the course is dependant on whether and when the student masters the new material. Many custom CBT sites include chat rooms to provide real-time student/teacher and student/student interaction. These sites may also contain audio, video, text, and pictures. The addition of qualitative and quantitative interactivity creates an advantage over simple HTML-based CTB in that a custom CBT site offers an educational experience that is more particularized to the individual student.

Disadvantages to the custom CBT approach include the software development cost, the web site maintenance and related cost, and the time-consuming management of the many interactive features. Software development costs related to custom programming, even involving off-the-shelf-software, may substantially increase on-going development and maintenance costs. Likewise, modifications to computer-based training plans or adding additional curricula may lead to extensive additional costs. Another significant disadvantage to the a custom CBT site is that the demands of the software, including the databases that keep track of student information, frequently require dedicated host servers that increase development, operation, and maintenance costs.

Current CBT sites are disadvantaged when using streaming video technology because such technology requires high bandwidth Internet connections to provide acceptable viewable content. Furthermore, bandwidth limitations force video content to be displayed in a small viewing window, approximately one and one-half inches by two inches. While the small viewing window may provide acceptable video quality, the small screen size is not conducive to a quality classroom experience. Existing systems seek to address this problem by utilizing data compression. Digital data compression dramatically reduces the size of a file, and therefore maximizes the amount of data that can be transferred between computers in a specified time period. But data compression also reduces the quality of the data. The degree of compression and therefore the resultant quality of the data displayed is variable. For example, increasing the compression of an image may reduce the number of colors and/or blur the appearance of the image. Similarly, as the compression of audio is increased the frequency range and bit depth are decreased and the audio becomes less clear.

The present invention is directed to an improved system for distributing information content over a global computer network to students with diverse interests in a manner that utilizes the network resources of the content provider.

SUMMARY OF THE INVENTION

The present invention provides a system by which customized quality CBT can be presented over a global network such as the Internet, such method providing low development costs, low hosting costs, inexpensive class production, and high-quality audio-visual content.

A student, having an active connection to the server from a remote client and using a computer input device such as a mouse, keyboard or other such device, enters the CBT website disclosed by the present invention and thereupon registers as a new student by providing necessary pertinent information to the server host. Upon completion of the registration process, the student initiates and manages interaction with the online computer-based training plan, which plan may include such components as digitized and compressed multimedia presentations (including images, audio, and text), for example, as part of an interactive slide show, quiz, or exam.

An online plan can include slide show segments that contain digital images, digital audio and other media that is compressed and transmitted from a host server to the student's computer via the Internet. The images and audio can be taken from nondigital or already digitized sources and if necessary, converted to a digital format. The images for a slide show segment are selected and compressed into an appropriate compression format. The audio presented along with the video is also compressed in a similar manner. Once compressed, the images and audio are prepared for a slide show computer-based training plan format. The slide show is tested for image and audio quality. Where necessary, the compression rate of an image or audio segment is adjusted. Better compression provides for a more fluid viewing of the slide show without sacrificing image or audio quality. Additionally, optimum viewing of the streaming images and audio is achieved by client-side buffer programming without any concern for bandwidth limitations. This allows a student to complete the plans quickly and without interruptions.

Upon completion of the computer-based training plan the student can take an interactive exam that can be scored and the results of which are immediately displayed to the student along with a certificate that certifies the student passed the exam. The student then prints the certificate to a printer attached to the client.

BRIEF DESCRIPTION OF THE DRAWINGS

The many features and advantages of this invention are better understood with reference to the following detailed description of the preferred embodiment, along with the following drawings.

DETAILED DESCRIPTION OF THE PREFERRED EMBODIMENT

The present invention will now be described in detail with reference to a preferred embodiment thereof as illustrated in the accompanying drawings. In the following description, numerous specific details are set forth in order to provide a thorough understanding of the present invention. It will be apparent to one skilled in the art that the present invention may be practiced without some or all of these specific details. In other instances, well known process steps have not been described in detail in order not to unnecessarily obscure the present invention.

Figure 1:
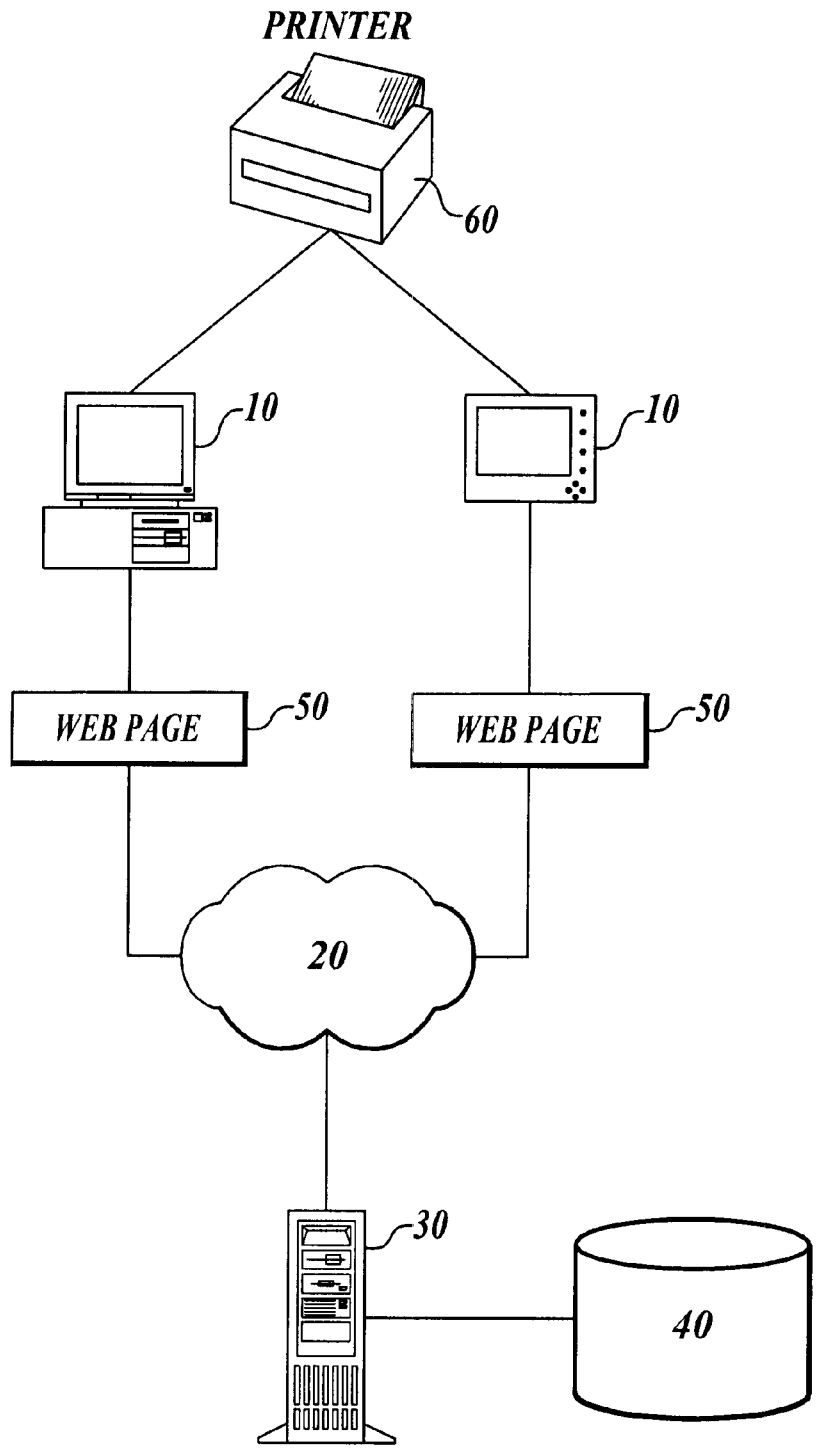
FIG. 1 is a block diagram illustrating an embodiment of the online computer-based training invention.

FIG. 1 is a block diagram depicting a preferred embodiment of the computer-based training system for use with a global communications network. In FIG. 1, a client 10 is connected via the Internet 20 to a server 30. The client has a printer 60 attached for producing hard-copy output. The server acts as host for database storage 40 of information that includes student registration information. Additionally, the server stores the computer-based training plans. The server 30 is an Internet server or Internet site capable of providing access to graphical web pages 50 and other web content, including images, HTML pages, sound files, and proprietary downloads (i.e., Shockwave files) to other computers including different types of clients 10 over Internet 20. While the server is preferably a web server, it may alternatively be any type of server capable of being accessed over a network by a remote client computer.

Figure 2:
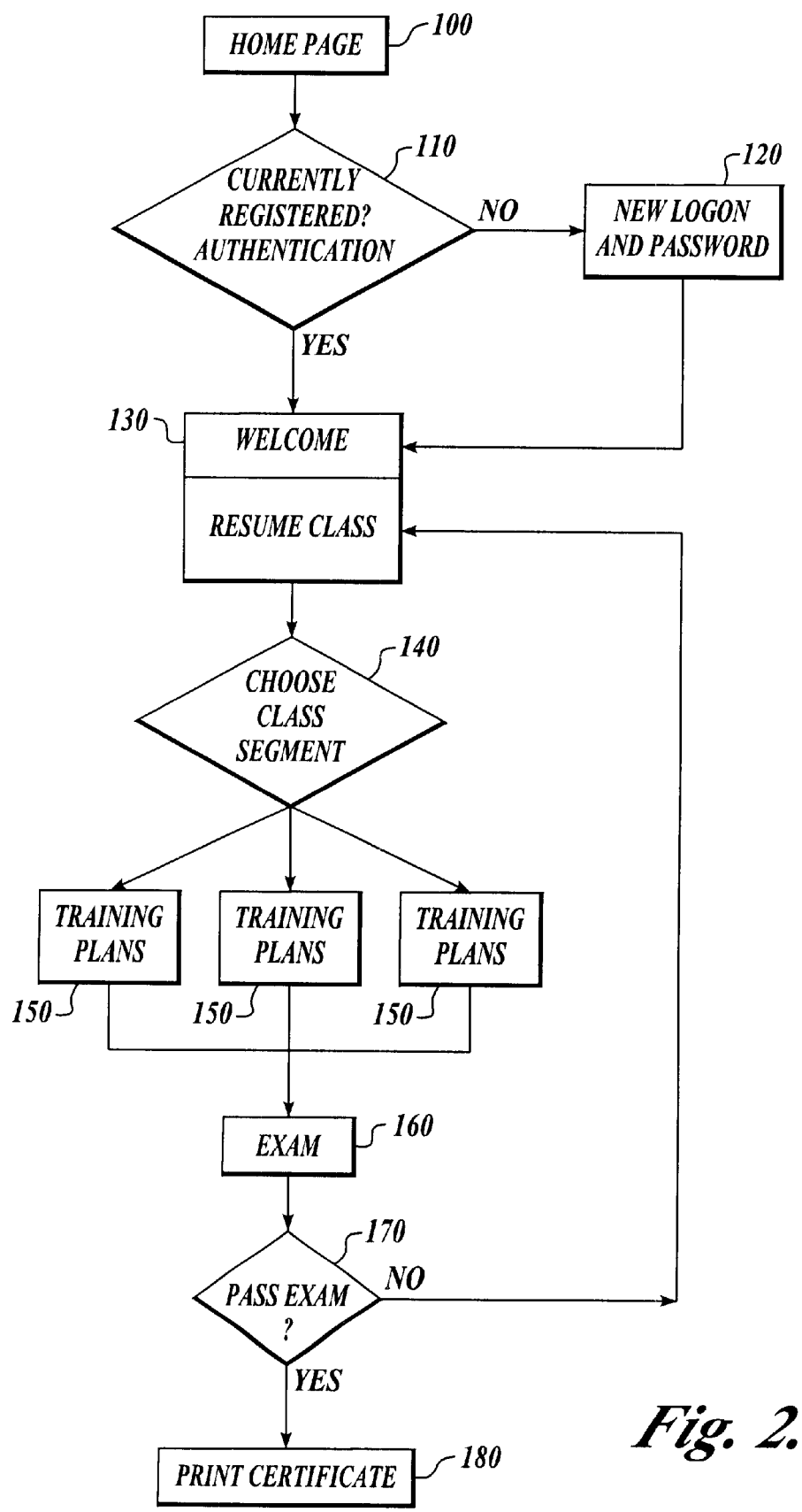
FIG. 2 is a flow chart depicting the student interface with the online computer-based training invention.

FIG. 2 is a flow chart depicting the student interface with the online computer-based training invention. As described with reference to both FIGS. 1 and 2, a student accesses the system to register and obtain a student logon and password via client 10. Specifically, the student accesses the main or "home" page on server 30 by entering an appropriate web address known as a Universal Resource Locator ("URL") into an Internet browser on a client 10. A web page 50 is sent to the client so that it may be viewed using the browser software. HTML is the preferred format for transmitting information from the server to the client. It will be understood by those skilled in the art that the client and server may communicate using any of a variety of other languages and data formats, and the present invention is not limited to the particular transmission format described.

As described more specifically in FIG. 2 with further reference to FIG. 1, a student accesses a home page 100 for the online computer-based training using client 10 via Internet 20. At the home page, the student is presented with a variety of options including, for example, the ability to register for a class, login and resume class or obtain information about the classes offered as well as general web site information. The student may select any of these options via client 10 using conventional input means, including a computer mouse to "click" on an associated hypertext link or a keyboard to enter a number, letter, or other symbol representative of the chosen option. In the present example, as shown in block 110, a returning student will provide a username and password and be authenticated by server 30 using database 40 information provided they had previously registered. A new student wishing to register for a class would click on the link labeled "Register for Class" and would provide such information as name, address, and payment method as shown in block 120. Once properly authenticated, the student is presented with a welcome and resume class screen 130. At decision block 140, the student chooses an element of the computer-based training plan content to view. Computer-based training plan content can include audio-slide presentations, text, figures, video, quizzes, tests or other elements. The student works through the associated computer-based training plan at block 150. It will be appreciated that a benefit of the present invention is that it allows students to manage their own progress through the training plan. For example, a student may view the slide show as often as they desire. A student may also manage other aspects of their progress during the presentation including, for example, when and how many time they take a quiz. Upon completion of the plan, the student takes an exam 160. If the student successfully passes the exam (decision block 170), the student receives a certificate of completion at block 180 that may be printed via printer 60 associated with client 10. If the student does not pass the exam, the student is returned to the welcome and resume screen 130 where they may retake the course, or exit the training system.

Figure 3:
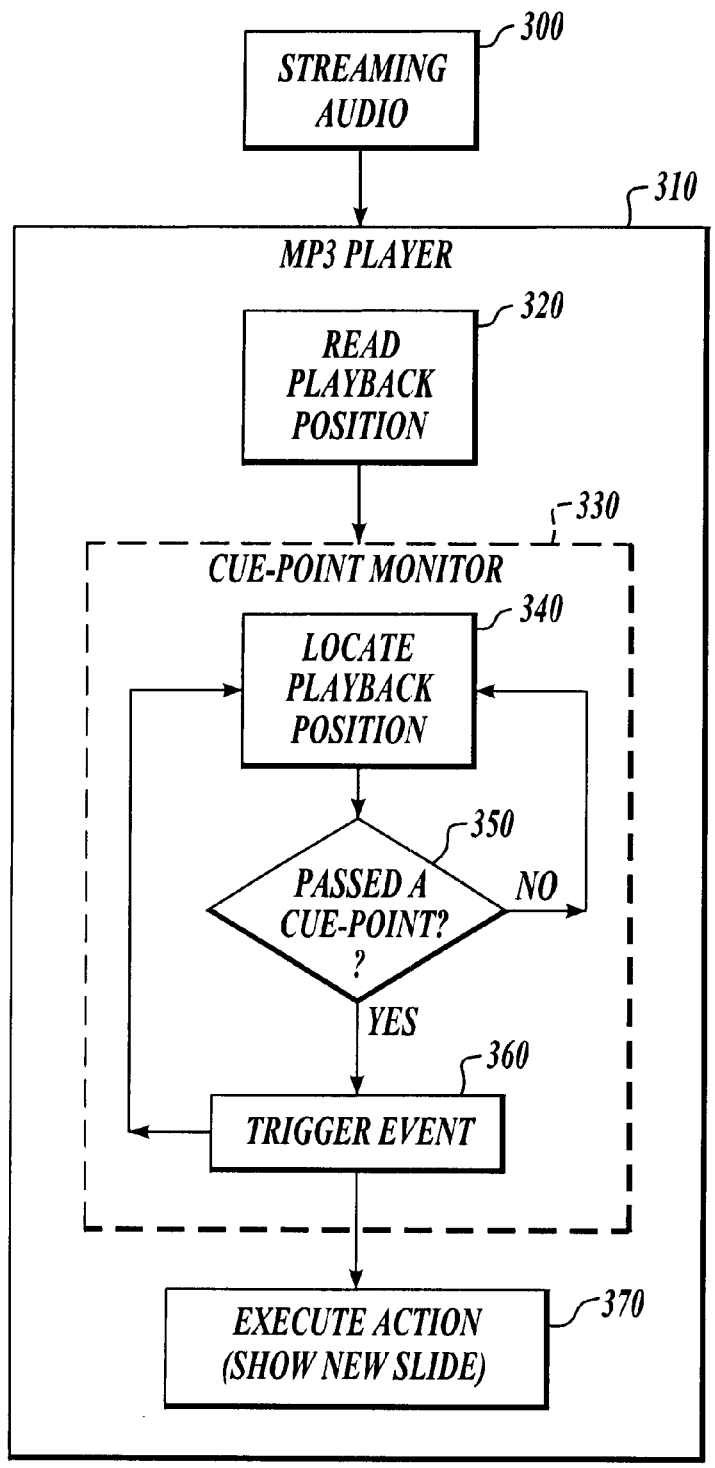
FIG. 3 is a flowchart depicting cue-point monitoring of streaming audio.

When viewing slide show content a system of cuing is enabled to ensure accurate audio timing during the presentation of the training slides, shown at block 150 of FIG. 2, the present invention monitors the audio as described more particularly with reference to FIG. 3. FIG. 3 is a flowchart illustrating a preferred method of cue-point monitoring of streaming audio in an MPEG Layer-3 ("MP3") format. An advantage of using the MP3 digital audio compression format with an MP3 player is that it allows high quality audio to be streamed at relatively low transfer rates over a network such as Internet 20 referenced in FIG. 1. Compared to other compression formats, the MP3 format itself lacks the support for cue-points to be saved within the audio file itself.

With reference to FIGS. 1 and 3, streaming audio in the present invention occurs at block 300. A server 30 streams data over the Internet 20 to an MP3 player 310 located on client 10. The audio's playback positions 320 provided by MP3 Player, are monitored by a cue-point monitor at block 330 and are used to trigger events, such as a slide transition in a training plan slide show. Cue-points mark specific times in a digital audio file. The main benefit of cue-points is their ability to keep the actions synchronized with the audio as it is playing. The audio may be paused by a client, or if the audio is being streamed over a network, paused due to network traffic. These situations can occur without any effect on the timing. To reap these benefits along with the benefits of MP3, a file format that does not inherently support cue-points, cue-points must be simulated with custom software. As explained below, a media designer can decide when the cue-points occur and what action each cue-point will trigger. The cue-points can be hard-coded within the software or they can be read from a file. The latter method is preferred and allows the cue-points to be changed without recompiling the programming component. The cue-point monitoring component 330 obtains the position of the MP3, the "playback position" 340, in units of time associated with the cue-point and the slide show presentation. The playback position is obtained from the MP3 player.

At decision block 350, as the streaming audio continues playing, a current cue point is evaluated to determine whether an appropriate cue-point has been passed in synchronization with the slide presentation. As the MP3 player 310 streams the audio 300 from the server 30 over the Internet 20, the cue-point monitor 330 must continuously check the playback position 340 as provided by the player. When the playback position passes a cue-point 350 the cue-point monitor 330 must evaluate the trigger event 360 associated with that cue-point and in the case of a slide show presentation as described in the present invention, at block 370, the cue-point monitor would display the next slide associated with the streaming audio. Those skilled in the art will recognize that other actions may follow from a trigger event, including, for example, ending the slide show. If the cue-point has not been passed, the logic returns to block 340 and the streaming audio segment associated with the current slide continues.

Any connection between computers via the Internet is inherently limited by connection speed. An advantage of the present invention is the use of digital data compression to dramatically reduce the size of a file and, therefore, to maximize the amount of data that can be transferred between client 10 and server 30 over the Internet 20 in a specified time period. And while data compression reduces the quality of the data, the present invention utilizes data compression in a way that maintains data quality.

Specifically, the present invention converts video to a streaming audio slide show presentation, which reduces the bandwidth requirements between server 30 and clients 10. This creates an environment which, among other things, allows the slide show to be presented to a broad range of clients 10 using a greater variety of servers 30, including clients and servers having lesser technological and bandwidth capabilities. The present invention also allows the slide show images to be shown in a larger viewing area at higher resolutions than video, and allows better quality audio, without sacrificing picture size and quality. These improvements are possible with less expensive slide show development cost. The present invention contemplates very small storage requirements on server file system 40. Moreover, a slide show eliminates the need for proprietary streaming servers and allows the streaming of audio from nonproprietary and less expensive Web servers. It will be understood by those skilled in the art that a variety of tools can be used to develop the slide show and a variety of server platforms can be used to host the CBT.

Figure 4:
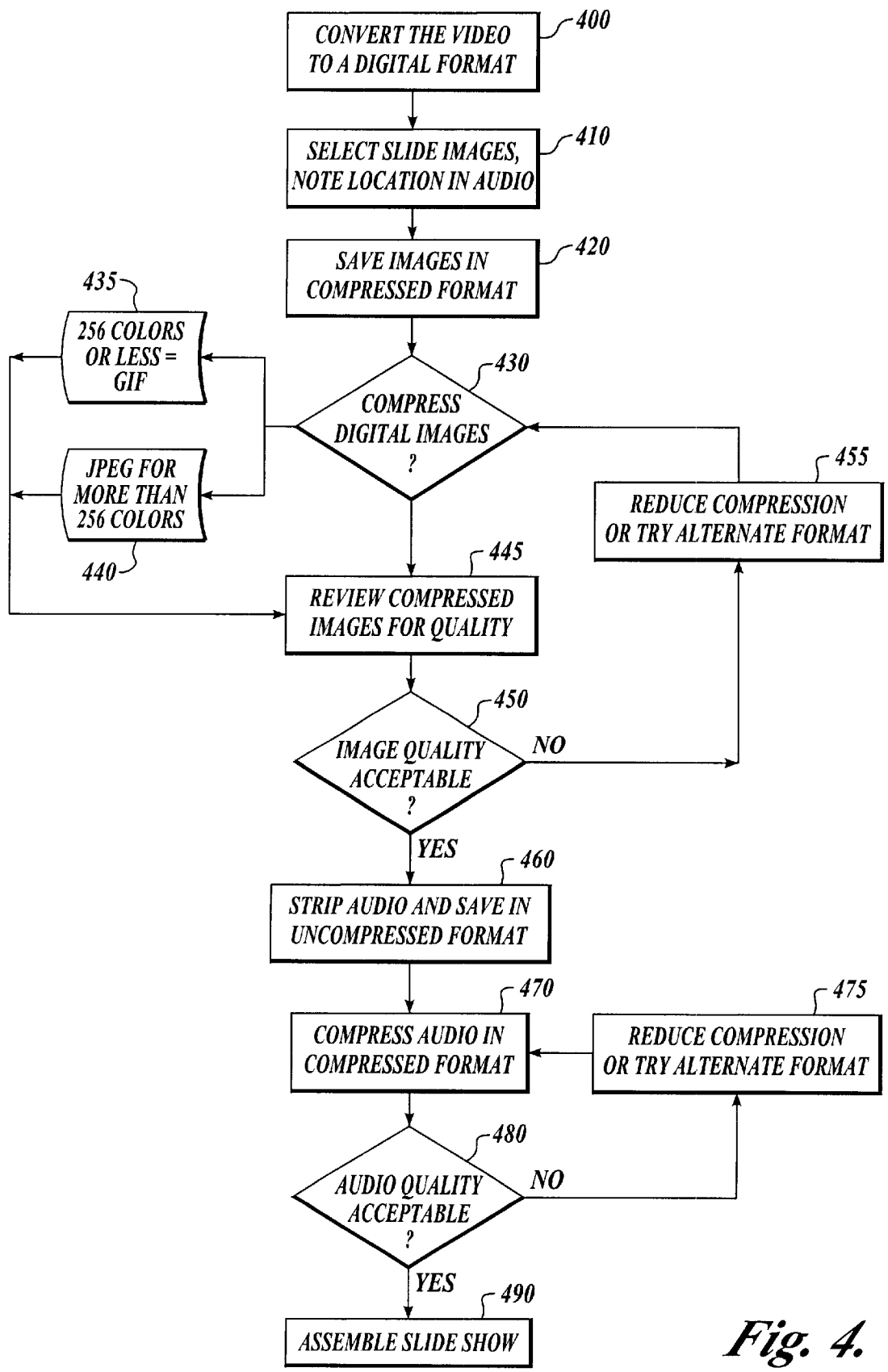
FIG. 4 is a flowchart depicting the conversion of video and audio to digital slide show format.

FIG. 4 is a flow chart of the operational logic of the slide assembly aspect of the present invention. Specifically, FIG. 4 describes the conversion of video to a streaming audio slide show format. At block 400, the video component of the existing material is converted to the separate images that will make up the slide show. If the video is analog it must be converted to a digital format; otherwise separate images are taken directly from the video material. This may be accomplished by use of an analog-to-digital video decoder. At block 410, the digital images that will make up the slide show are determined and documented. In the preferred embodiment this is accomplished by marking times in a digital video-editing program. At the same time, notations are made in the accompanying audio program so that the related audio portion remains linked to the corresponding images, for example by notation of cue-points (as defined above). At block 420, the images are saved in a lossless format where every bit in the extracted copy is exactly the same as in the original image file, such as a "bitmap" data file or Tagged Image File Format ("TIFF") file. At decision block 430, the compressed digital images needed for the application are evaluated to determine the type and quality of digital format necessary for the slide presentation. If images with 256 colors or less are acceptable, the images are converted to a Graphics Interchange Format ("GIF") at block 435. If images with a broader range of colors are necessary, the images are converted to Joint Photographic Experts Group ("JPEG") compressed image format at block 440. While GIF and JPEG are the preferred format for compression, the present invention is equally applicable when other compression formats are used. At block 445 the balance of download speed and image quality is tested by experimenting with the compressed image with the goal of producing the acceptable images from the specific content. At decision block 450, the acceptability of the resulting image is evaluated. If the image quality or size of the specific content is not acceptable, at block 455 alternative file formats, compression level, or color depth may be used, and the digital images are again evaluated at decision block 430 and compressed accordingly. This step is most easily accomplished using one of a variety of digital video editing programs to save frames as bitmaps and one of many image-editing programs for compressing the images.

Continuing reference to FIG. 4, the audio is stripped from the combined audio-video material and saved in an uncompressed digital format at block 460 such as a wave table synthesis ("wav") file used with a lossless codec. While a wavetable synthesis file is the preferred method of saving the audio file, other uncompressed formats may be used in the context of the present invention. At block 470, the uncompressed audio files are compressed. In the preferred embodiment, compression formats such as MP3 and Shockwave Audio are used. The decision on the particular format to use depends on such factors as the format compression ratio, the resultant sound quality, and the proprietary nature of the training system and Web server. The audio file must be compressed to the degree that it can be played while the data is downloading. At decision block 480, the compressed audio is tested for an acceptable download rate and sound quality. If the download rate is not acceptable, compression may need to be increased. After adjusting compression, if the audio quality is not acceptable with the chosen compression format, reduced and/or alternate compression format may be used at block 475. If audio quality is acceptable, the logic proceeds to block 490, where the corresponding audio portions are integrated with the images.

Figure 5:
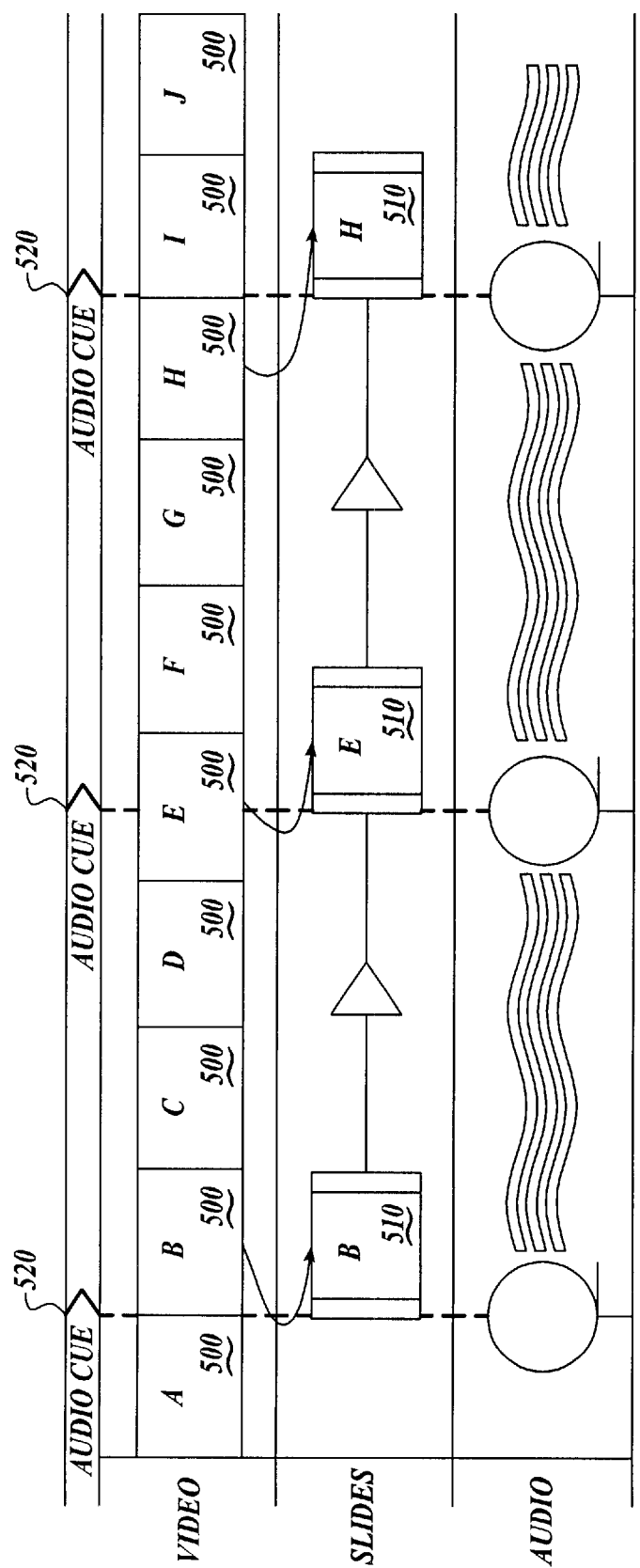
FIG. 5 is a block diagram illustrating the separation of slides from video and notation of cue points.

FIG. 5 is a block diagram illustrating the separation of slides from video and notation of cue points generally referred to above and specifically referenced in association with the logic of block 410 in FIG. 4. A software video-viewing program such as Adobe Premiere is used to view individual slides, collectively slides A through J of video segment 500, and accompanying audio. The selected slides, B-E-H (510) are copied from the video and audio cue-points 520 are noted to coincide with the presentation of each selected slide.

While this invention has been described in terms of preferred embodiments, there are alterations, permutations, and equivalents that fall within the scope of this invention. For example, individual images used for a computer-based training plan slide show can be selected directly from a digital storage apparatus attached to a digital camcorder, thus bypassing the loading of images in a personal computer for image selection. It is therefore intended that the following appended claims be interpreted as including all such alterations, permutations, and equivalents as fall within the true spirit and scope of the present invention.

The embodiments of the invention in which an exclusive property or privilege is claimed are defined as follows:

1. A method for creating streaming computer-based training presentation using digitally compressed multimedia presentations for use in a computer-based training system, comprising:
   (a) converting an analog source having audio and video components to a digital format;
   (b) selecting audio segments and images from the digital audio and video components for use in the streaming computer-based training system;
   (c) compressing the audio segments and images into variable digital audio and image formats;
   (d) testing the quality of the digitally compressed audio segments and images; and
   (e) assembling the tested compressed digital audio segments and images in the streaming computer-based training system by integrating the audio segments and the images.

2. The method of claim 1, wherein converting analog audio and video to a digital format comprises removing analog audio and video components from the source.

3. The method of claim 1, wherein selecting audio segments and associated images for use in the streaming computer-based training system comprises:
   (a) evaluating the video component to determine a digital image desired for the computer-based training system;
   (b) extracting the digital image from the video component;
   (c) noting the audio segment corresponding to the selected digital image; and
   (d) saving the digital image in a lossless format where every bit in the extracted digital image is the same as in the original digital image.

4. The method of claim 1, wherein compressing analog audio into variable digital audio format comprises:
   (a) determining audio quality desired for the computer-based training system;
   (b) saving the analog audio in an uncompressed digital format; and
   (c) compressing the uncompressed digital format of the analog audio using a compression format based on the desired resultant sound quality and the proprietary nature of the training system.

5. The method of claim 1, wherein compressing images into variable digital image format comprises:
   (a) evaluating type and quality of the digital format desired for the computer-based training system;
   (b) if a digital image with 256 colors or less is acceptable, compressing the digital image to a Graphics Interchange Format; and
   (c) if a digital image with a broader range of colors than 256 colors is required, compressing the digital image to a Joint Photographic Experts Group format.

6. The method of claim 1, wherein testing the quality of the digitally compressed audio segments comprises:
   (a) evaluating the compressed audio segments for download rate and soundquality;
   (b) if the download rate is unacceptable, altering the degree of compression of the audio segment; and
   (c) if the audio quality is unacceptable with the compression format, modifying the compression format.

7. The method of claim 1, wherein testing the quality of the digitally compressed images comprises:

(a) evaluating the digitally compressed image for download rate and image quality;
(b) if the download rate of the digital image is unacceptable, altering the degree of compression of the digital image; and
(c) if the digital quality is unacceptable with the compression format, modifying the compression format.

8. The method of claim 7, wherein modifying the compression format comprises recompressing the digital image into an alternate digital format.

9. The method of claim 7, wherein modifying the compression format comprises altering color depth of the digital image.

10. The method of claim 1, wherein the computer-based training system includes a server and the method for creating computer-based training presentation using digitally compressed audio and images further comprises storing assembled streaming computer-based training plans on the server.

* * * * *